United States Patent [19]
Ford

[11] 3,975,582
[45] Aug. 17, 1976

[54] FLUID LEVEL SENSING PROBE
[75] Inventor: David Julian Ford, Stapleford, England
[73] Assignee: TRW Inc., Cleveland, Ohio
[22] Filed: Nov. 4, 1974
[21] Appl. No.: 520,851

[30] Foreign Application Priority Data
Nov. 5, 1973    United Kingdom............... 51180/73

[52] U.S. Cl............................. 174/153 R; 339/128;
340/244 C; 73/304 R
[51] Int. Cl.²...................... G08B 5/22; H01B 17/30
[58] Field of Search ................. 73/304 R; 324/65 P; -
D26/1 L; 340/244 C; 339/128, 61 R, 61 M,
60 R, 126 RS; 200/61.05; 174/153

[56] References Cited
UNITED STATES PATENTS
2,891,103    6/1959    Swengel............................. 339/128
3,622,688    11/1971    Link et al...................... 339/126 RS
3,666,903    5/1972    Bata et al............................. 340/59

Primary Examiner—S. Clement Swisher
Assistant Examiner—Denis E. Corr
Attorney, Agent, or Firm—James R. O'Connor

[57] ABSTRACT

A probe for use in a fluid level sensing system has an electrode and an insulating body located between the ends of the electrode. The insulating body is in the form of a hollow, tubular shell and includes electrode carrying parts ad resilient fluid container wall engaging parts. The electrode and container wall engaging parts are spaced along the longitudinal axis of the electrode so that, when the probe is mounted in its operative position in an opening in a fluid container, the container wall engaging parts resiliently engage the container wall parts which bound the opening, and the electrode is supported by the shell at a position within the container and spaced from the container wall.

7 Claims, 7 Drawing Figures

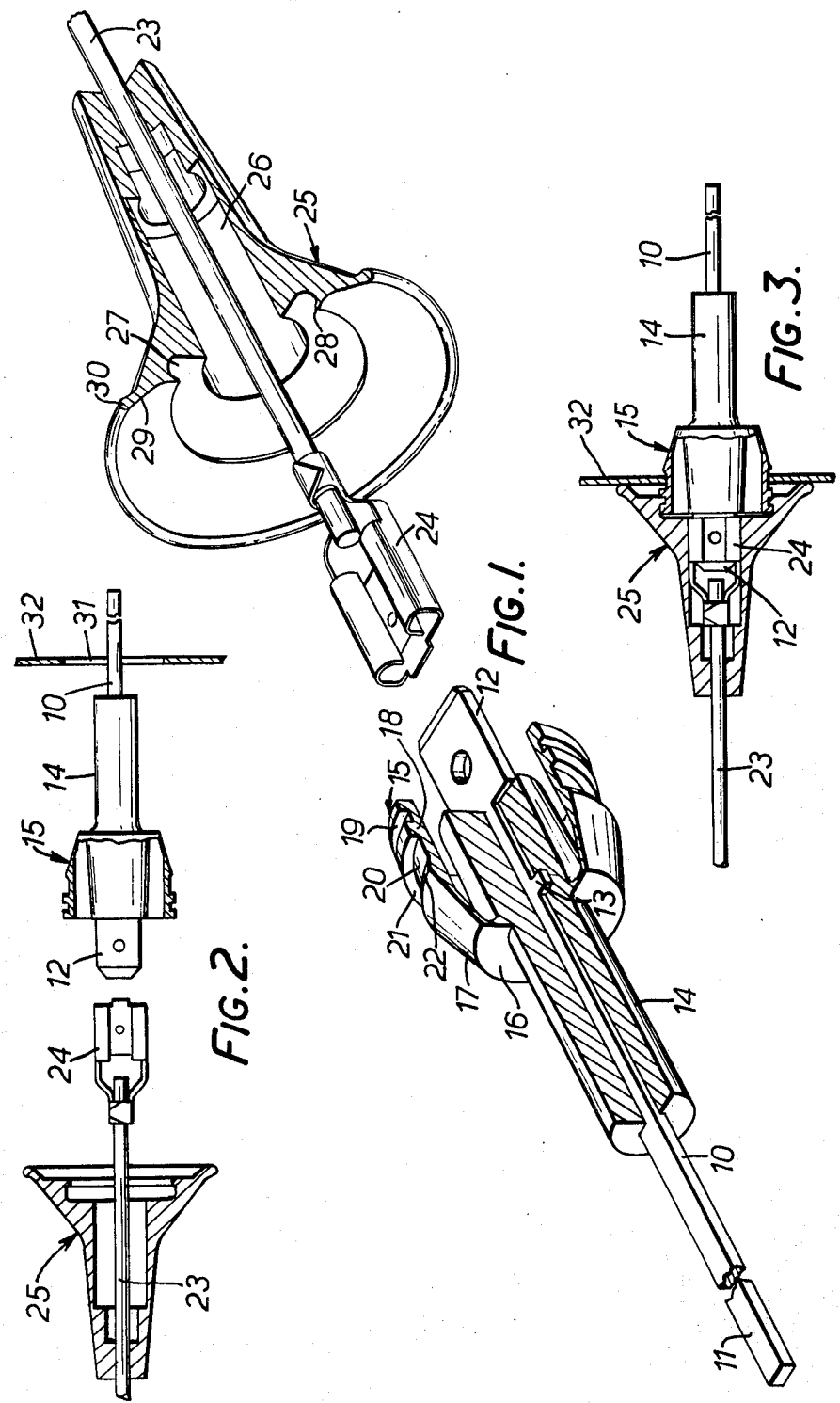

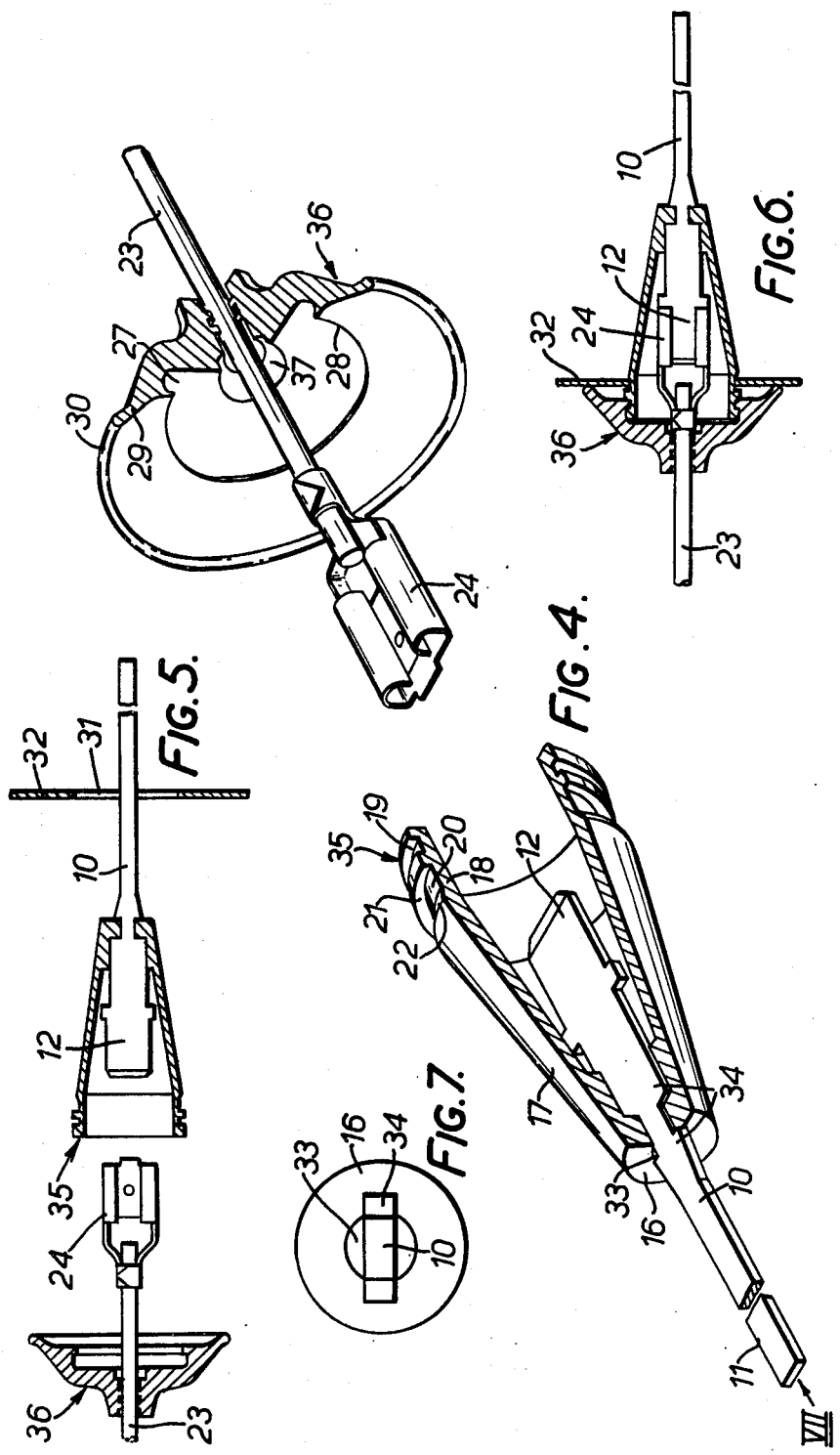

FLUID LEVEL SENSING PROBE

BACKGROUND OF THE INVENTION

This invention relates to a probe for use in an electrical fluid level sensing system. In such systems the probe serves to make electrical contact with a fluid whose level in a container is to be monitored, whereby the electrical resistance of a circuit including the probe and the liquid may indicate the presence or absence of liquid in contact with the probe.

Such systems are being used currently in automobiles and other motor vehicles to indicate when the level of fluid in a reservoir or other container has fallen below a predetermined danger level. For example, the reservoir may hold water from an internal combustion engine cooling system, or a fluid used for operating a clutch or a foot brake system.

Such a probe conveniently comprises an elongate electrode carried intermediate its ends in an electrically-insulating body which in use is mounted in an aperture formed in the fluid container wall.

In applying such a fluid level sensing system in an automobile, for example, the probe should be capable of being readily fixed in the wall of the container or reservoir at the required position, should be simple and inexpensive, and should require little preparation in making a suitable mounting aperture in the fluid container wall. Known probes are of complex construction, often require a specially prepared mounting aperture, for example, a screw-tapped aperture, and need the exercise of great care in fitting them in position.

SUMMARY OF THE INVENTION

According to the present invention in a probe as aforesaid, the insulating body comprises a hollow, tubular shell which has electrode-carrying parts, and resilient fluid container wall-engaging parts, the electrode and container-engaging parts being spaced apart along the longitudinal axis of the electrode, so that when the probe is mounted in its operative position in an aperture in a fluid container, the container wall-engaging parts resiliently engage the container wall parts which bound the aperture and the electrode is supported by the shell at a position within the container and spaced from the container wall.

Such a probe is readily inserted into, and retained in position in, an aperture intended to receive the probe, by virtue of the resilience of the container wall-engaging parts and the outward pressure they exert on the container wall parts.

The said container wall-engaging parts include a cylindrical seating which is disposed between two spaced annular abutments which serve to position the seating in register with the container wall parts which bound the aperture.

With such an arrangement the said aperture in the container wall may be bounded by a plain cylindrical surface such as is readily formed by very simple manufacturing processes, and yet the probe is positively retained in position when inserted in the aperture.

One of the said annular abutments may comprise an upstanding shoulder for abutting against the outer side of the container wall to provide positive location of the probe relative to that side; and the other annular abutment may comprise a frustoconical surface which converges towards and merges into the cylindrical seating to facilitate snapping the shell into position with said shoulder adjoining the outer side of the container wall.

The shell includes a frustoconical wall which interconnects the said electrode carrying and container wall-engaging parts, and diverges towards the container wall-engaging parts.

This construction readily enables the shell to impart a desirable degree of resilience to the wall-engaging parts, and to accommodate the external connection end of the electrode, and, in addition in some preferred constructions, a mating external circuit connector.

The said electrode carrying parts include a bushing in which is secured the said electrode, and this bushing extends along the electrode on either end of the shell and is sealed on the electrode in a manner which prevents the flow of fluids and gases between the shell and the electrode. Alternatively, the electrode carrying parts may engage the electrode firmly, but in a manner permitting, the flow of gases between the said shell and the electrode.

The insulating body comprises a one-piece moulding of a resilient or semirigid rubber or other synthetic plastics material.

According to another feature of the present invention, the probe has a cap detachably secured on the open end of the shell adjacent the container wall-engaging parts, the cap having an aperture therein through which an external circuit conductor may be threaded for connection with the electrode, the aperture being arranged to closely engage the conductor so that, when the probe is in a container wall, contaminants outside the cap cannot enter the cap and reach the electrode and a mating external circuit connector carried by said conductor.

The cap has a resilient internal rim which is arranged to sealingly engage in a groove formed externally on the open end of the shell adjacent the container wall-engaging parts, the rim being engageable in the said groove by a snap-in action; and the cap carries externally an integrally-formed resilient skirt having a peripheral portion which is tensioned against the outer surface of the fluid container wall to prevent the ingress of contaminants into the space enclosed between the container wall and the cap and skirt.

As in the case of the said insulating body, the cap comprises a one-piece moulding of a resilient or semirigid rubber or other synthetic plastics material.

Two probes constructed in accordance with the present invention for use in an automobile fluid level sensing system will now be described by way of example and with reference to the accompanying drawings.

BRIEF DESCRIPTION OF THE DRAWINGS

FIG. 1 shows a perspective view of the various parts which together constitute a first probe, these parts being shown separated longitudinally and with appropriate portions thereof cut away to show more readily the constructional details;

FIG. 2 shows a longitudinal sectional view of the separated parts of the first probe ready for assembly in a plain hole in the wall of a fluid container;

FIG. 3 shows a longitudinal sectional view similar to that of FIG. 2, but with the various parts assembled to form the first probe mounted in the container wall hole;

FIGS. 4, 5 and 6 show, in respect of a second probe, views corresponding to the views of the first probe shown in FIGS. 1, 2 and 3, respectively; and FIG. 7 shows an end view of the second probe taken in the direction indicated by the arrow VII in FIG. 4.

DESCRIPTION OF A PREFERRED EMBODIMENT AND AN ALTERNATIVE EMBODIMENT

Referring now to FIGS. 1 to 3 of the drawings, the first probe includes metal electrode 10 having a fluid contacting end 11 (the internal end), an enlarged "male" connection end 12 (the external end), and transverse location lugs 13. Adjacent the male connection end 12, the electrode is carried securely and in a fluid-tight manner in a slender insulating bushing 14 of a suitable semirigid plastics material such as polypropylene. Other suitable thermoplastics materials may be used.

The end of the bushing adjacent the male connection end of the electrode is of larger diameter than the other end, and is surrounded by a thin-walled concentric cup-shaped shell or shroud 15 which is joined to the bush at an intermediate position thereon.

The shroud has an end part 16 from which a conical part 17 extends to a cylindrical part 18. Near the free end of the cylindrical part 18, a cap-receiving groove 19 is formed, and between this and the conical part 17 is formed a cylindrical seating 20 which is bounded at its respective ends by radial and conical location or abutment surfaces 21 and 22.

The bush and shroud are formed by being injection moulded directly onto the electrode. Longitudinal displacement of the bush and shroud on the electrode is prevented by the transverse location lugs 13. This moulding is made of any suitable plastics material which has good resistance to heat, oil, and chemical attack by the fluid, the level of which is to be monitored by the probe, and is suitably flexible (semirigid).

The somewhat central positioning of the shroud on the bushing gives:
i. a good electrical tracking distance between the electrode male connection and the seating 20 which is intended to engage in the fluid container wall; and
ii. good flexibility to the shroud so that the seating 20 may properly engage in a fluid-tight manner with the said plain bore of the container wall hole.

Electrical connection with the external end of the electrode is obtained by way of an insulated electrical conductor 23 which carries at its end a female connector 24 of conventional form. To protect the electrical connection made by contact of the female and male connector parts, a cap 25 of a suitably flexible plastics material is provided. This cap may be made of ethyl vinyl acetate, polythene, PVC, polyurethane, or any other suitable thermoplastics material.

This cap is arranged to engage at one end tightly around the conductor 23, and at the other end tightly around the free end of the shroud 15. The cap encloses a small diameter cylindrical chamber 26 which is dimensioned to receive the female connector 24, and a larger diameter chamber 27 which is dimensioned to receive the free end of the shroud 15. The cap has formed integral therewith at its open end an inwardly-projecting lip 28 which is arranged to engage closely in the cap-receiving groove 19 formed near the free end of the shroud 15 when the cap is pressed longitudinally onto that end of the shroud. The cap has externally of the chamber 27 and lip 28 a short shallow conical skirt 29 which has a beaded rim 30.

Referring now to the FIGS. 2 and 3, to put the probe into use, the probe is inserted in a plain cylindrical hole 31 formed in the wall 32 of a fluid container, in which the level of the fluid is to be monitored, in the manner indicated in the FIG. 2. This hole 31 has a diameter slightly smaller than that of the seating 20 formed on the shroud 15, so that to bring the probe into its operative position in the container wall, a longitudinal force sufficient to compress the maximum diameter part of the conical portion 17 of the shroud has to be applied to the probe, whereupon the probe snaps into position in the hole. The radial abutment face 21 serves to limit the axial travel of the probe and thus to locate it axially whilst the conical surface 22 helps the probe to readily take up its final position in the hole, with the seating 20 radially compressed by the constricting cylindrical bore of the hole. In FIG. 3 the probe is shown in its final position in the container wall.

Electrical connection with the probe is now made by sliding the resilient female connector 24 onto the male connection end 12 of the electrode 10, and, to protect the electrical connection so made, the cap 25 is pushed along the conductor 23 so as to enclose within its cavities 26, 27 the female connector 24. The application of a suitably high longitudinal force to the cap 25 causes the lip 28 of the cap to ride over the lip at the free end of the shroud, and thus enables it to become located and trapped in the cap-receiving groove 19 of the shroud.

As the lip 28 of the cap rides over the lip of the shroud, the beaded rim 30 of the cap comes into contact with and is flexed by the wall of the fluid container. Thus when the cap is located in its final position, the skirt of the cap presses firmly against the container wall and thus provides an effective seal for precluding contaminants from the electrical connection formed by the engaged male and female connectors. Furthermore, the pressure exerted by the skirt on the container wall biases the probe longitudinally so that the conical surface 22 of the shroud is urged into contact with the bore of the hole 31.

In the completed assembly, as shown in FIG. 3, the electrical connection formed by the male and female connectors is protected not only from the ingress of contaminants from outside the cap, but also from any undesirable leakage of fluid that might occur through the hole 31.

Referring now to FIGS. 4 to 7 of the drawings, there is shown a second probe similar to the first probe and having those parts which are equivalent to parts in the first probe indicated by the same reference numerals as are used in FIGS. 1 to 3.

In the second probe the shroud 35 has a circular aperture 33 formed in its end part 16, as is best seen in FIG. 7. The electrode 10 is of rectangular cross section and firmly fits in the circular aperture, leaving a passage on either side of the electrode which communicates between the inside and the outside of the shroud. This passage serves as an air bleed to maintain the fluid container at constant pressure despite variations in the fluid level. The electrode is press fitted into the shroud after the shroud has been formed from a suitable plastics material, and it is held in position by wing portions 34. In this position the external end 12 of the electrode lies within the shroud.

The cap 36 is generally similar to the cap 25 and is similarly arranged to protect the electrical connection made by contact of the female connector 24 with the male connector 12. However, the cap 36 engages round the conductor 23 at a position adjacent the chamber 27, an end part only of the female connector being receivable in a recess 37.

Referring now to FIGS. 5 and 6, the second probe is inserted into a cylindrical hole 31 formed in the wall 32 of a fluid container at a position above the maximum required fluid level. The method of insertion is generally similar to that for the first probe, except that the connection between the male and female connectors lies inside the shroud 35. Thus only a relatively small proportion of the assembled probe extends outside the wall of the fluid container, enabling the probe to be used in positions where the clearance available outside the container is very small.

The materials suitable for the cap 25 and shroud 15 of the first probe are also suitable for the cap 36 and shroud 35, respectively, of the second probe.

When the probe is intended for use in a pressurized fluid container, the electrode 10 is sealed to the shroud 35, as by moulding the shroud on the electrode, so that no air bleed passage is formed.

The shroud 15 of the first probe may be extended beyond the external end 12 of the electrode, in which case the cap 36 of the second probe may suitably be used instead of the cap 25. Similarly the cap 25 of the first probe may be used with the shroud 35 of the second probe, in which case the shroud 35 may be shortened.

Each probe described above requires a simple hole in the fluid container wall in which to engage, and location of the probe in that hole is simple, quick, and effective. Each cap is readily secured in position, and can be readily withdrawn to give access to the said electrical connection with the probe.

The electrode 10 may have any suitable length, and an end part can be readily cut off to set the fluid level to be monitored.

I claim:

1. A probe for use in a fluid sensing system comprising an elongate electrode and an insulating connector disposed on the electrode, the connector being seated in an opening in a wall of a fluid container and including an electrode carrying bushing and an integral resilient, container wall-engaging shroud, the container wall-engaging shroud including a cylindrical seating disposed between two integral annular abutments, the electrode carrying bushing being seated in the container and supporting the electrode within the container in spaced relation to the wall of the container, the seating on the container wall-engaging shroud being resiliently tensioned against the wall of the container which circumferentially bounds the opening therein and the abutments being disposed on opposite sides of the container wall to position the seating in register with the opening a cap detachably secured to the container wall engaging shroud, the cap having an aperture therein through which an external circuit conductor is threaded and connected with the electrode and including a resilient internal rim which is snapped into and sealingly seated in a groove formed externally on the connector.

2. A probe according to claim 1 wherein one of the annular abutments comprises an upstanding shoulder which abuts the outer side of the container wall.

3. A probe according to claim 2 wherein the other annular abutment has a frustoconical surface which converges towards and merges into the cylindrical seating to facilitate snap insertion of the connector into the container opening to the extent permitted by engagement of the shoulder with the outer side of the container.

4. A probe according to claim 3 wherein the connector includes a frustoconical wall which interconnects the electrode carrying bushing and container wall-engaging shroud and diverges towards the shroud.

5. A probe according to claim 1 wherein said bushing extends along a substantial length of the electrode and is sealed on the electrode to inhibit the flow of fluids and gases between the connector and the electrode.

6. A probe according to claim 1 wherein there is a space between the electrode carrying bushing and the electrode which permits the flow of gases between the connector and the electrode.

7. A probe according to claim 1 wherein the cap includes an integrally-formed external resilient skirt which is tensioned against the outer side of the container and circumferentially bounds the wall of the container defining the opening therein.

* * * * *